UNITED STATES PATENT OFFICE.

ANSIL MOFFATT, OF INDIANAPOLIS, INDIANA.

PIGMENT.

990,155.

Specification of Letters Patent. Patented Apr. 13, 1911.

No Drawing.

Application filed September 15, 1910. Serial No. 582,146.

*To all whom it may concern:*

Be it known that I, ANSIL MOFFATT, a citizen of the United States, residing at the city of Indianapolis, in the county of Marion and State of Indiana, have invented certain new and useful Improvements in Pigments, of which the following is a specification.

This invention relates to a composition of matter consisting of a pigment composed of barium sulfate in a state of extreme subdivision.

The principal object of my invention is to produce an extremely finely subdivided barium sulfate in large quantities and in a very pure state directly from the natural mineral barium sulfate.

It has long been well known that barium sulfate, when brought into a condition of extremely fine subdivision, may then be cleared from all impurities, as it is the finest imaginable powder and is not affected by any known acid. It is also well known to those familiar with the art that the pigments produced by the methods now in use fail to adequately answer the purposes of an ideal covering pigment, such as is desired in pure white paint. Both of the best known methods, one a mechanical method, and the other an indirect and costly chemical method, result in purified barium sulfate whose "body" or covering power is inadequate and which is possessed of little opacity.

Generally speaking, my process of treatment consists in fusing or melting sodium chlorid or any other suitable alkaline chlorid, with barium sulfate, until the latter enters into a complete state of solution or alloy with said chlorid, and thereby becomes extremely finely subdivided. When the fused or melted mixture is cooled, the chlorid, being a soluble salt, may be dissolved out from the barium sulfate, which latter is insoluble and will thus remain behind in a state of extreme subdivision, to be prepared for commerce in any form, as requirements dictate.

In the foregoing paragraph, and in the succeeding parts of my specification, I refer to the barium sulfate as being "extremely finely subdivided." This is a term which I use to indicate the extreme subdivision of the barium sulfate which I succeed in producing by my process, to distinguish it from the ordinary barium sulfate heretofore produced by other methods. The principal evidence of this extreme subdivision is found in the adequate and thorough covering power and complete opacity of my product when used as a paint pigment.

My preferred method of treating barium sulfate is as follows: I take the natural form of barium sulfate (variously known under the names of barite, barytes, heavy spar or tiff) and mix it suitably with sodium chlorid, this being both an economical and efficient solvent for barium sulfate and having a low fusing or melting point. The temperature or point of fusion will be high or low according to the proportion of sodium chlorid in the mixture, and the proportion of sodium chlorid used is of such quantity that the two salts will be in molecular proportion, or the sodium chlorid may be in excess, so that the fused or melted alloy will become homogeneous at an early period. The mixture of barium sulfate and sodium chlorid is heated in an appropriate vessel until fusion occurs, and is maintained in a state of fusion until the alloy or solution is homogeneous or complete. Upon reaching this complete state of alloy, the fused mixture is withdrawn and suitably cooled. The cooling process may be carried out either by pouring the mixture out to cool, or by pouring it into water in a gradual stream. Whichever method is used, the congealed product is then boiled in water to dissolve the alkaline chlorid and to precipitate the barium sulfate. The precipitate of barium sulfate thus remaining, by reason of its insolubility in water, is the extremely subdivided product sought for by my process. As a final step in its production, it may be suitably treated by a process of washing and bleaching. It is washed in a water bath, to remove any impurities of a solid nature which may remain, and may be treated with small quantities of acid to remove any coloring impurities. The purified barium sulfate may be drained and dried and suitably packed.

The result produced by the process above set forth is a pigment of superior quality, especially suitable for use as a paint pigment. Extended experiment has shown the fact that a perfect pigment, chemically produced and divided to an exceptionally high degree, may be supplied to enter commerce at a cost approximating $20.00 per ton. This product is derived from the mineral or natural barytes or "tiff" and is the result entirely of the process hereinbefore described. Its cost of production is small, by reason of the comparative simplicity, and ease of installation, of the apparatus necessary, and by reason of the general commercial quantities in which the necessary solvent can be obtained.

I claim:

1. A pigment body consisting of barium sulfate precipitated from an alloy of natural barium sulfate and an alkaline chlorid.

2. A pigment body consisting of barium sulfate precipitated from an alloy of natural barium sulfate and sodium chlorid.

In testimony whereof I have hereunto affixed my signature in the presence of two witnesses.

ANSIL MOFFATT.

Witnesses:
WILLIAM J. HENLEY,
E. FRANK ESTES.